United States Patent
Butzmann et al.

(10) Patent No.: US 9,203,336 B2
(45) Date of Patent: Dec. 1, 2015

(54) DRIVE UNIT FOR AN ELECTRIC MOTOR

(75) Inventors: Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 14/114,225

(22) PCT Filed: Apr. 24, 2012

(86) PCT No.: PCT/EP2012/057474
§ 371 (c)(1),
(2), (4) Date: Jan. 4, 2014

(87) PCT Pub. No.: WO2012/152578
PCT Pub. Date: Nov. 15, 2012

(65) Prior Publication Data
US 2014/0111123 A1  Apr. 24, 2014

(30) Foreign Application Priority Data
May 6, 2011  (DE) .......... 10 2011 075 429

(51) Int. Cl.
*H02P 23/00* (2006.01)
*H02M 7/483* (2007.01)
*H02M 7/487* (2007.01)
*B60L 11/18* (2006.01)
*H02J 7/02* (2006.01)
*H02P 27/14* (2006.01)

(52) U.S. Cl.
CPC ............ *H02P 23/00* (2013.01); *B60L 11/1803* (2013.01); *B60L 11/1864* (2013.01); *H02J 7/022* (2013.01); *H02M 7/483* (2013.01); *H02M 7/487* (2013.01); *H02P 27/14* (2013.01); *Y02T 10/642* (2013.01); *Y02T 10/7005* (2013.01); *Y02T 10/7011* (2013.01); *Y02T 10/7061* (2013.01)

(58) Field of Classification Search
CPC ....................................................... H02P 23/00
USPC ............................................. 318/139, 34, 558
See application file for complete search history.

(56) References Cited

U.S. PATENT DOCUMENTS

| | | | |
|---|---|---|---|
| 5,773,962 A | 6/1998 | Nor | |
| 7,439,697 B2 * | 10/2008 | Miyazaki et al. | ........ 318/400.41 |
| 7,528,581 B2 * | 5/2009 | Miyazaki et al. | ............. 320/163 |
| 8,487,568 B2 * | 7/2013 | Franke | ....................... 318/400.3 |

FOREIGN PATENT DOCUMENTS

EP   0 727 870 A2   8/1996

OTHER PUBLICATIONS

International Search Report corresponding to PCT Application No. PCT/EP2012/057474, mailed Jun. 7, 2013 (German and English language document) (5 pages).

* cited by examiner

*Primary Examiner* — David S Luo
(74) *Attorney, Agent, or Firm* — Maginot, Moore & Beck LLP

(57) ABSTRACT

A drive unit for an electric motor comprises a multilevel inverter and a battery. The battery comprises at least one battery module train comprising a plurality of battery modules connected in series, each module having at least one battery cell and one coupling unit. The at least one battery cell is connected between a first input and a second input of the coupling unit. The coupling unit is designed to connect the at least one battery cell between two terminals of the battery module in response to on a first control signal and to connect the two terminals in response to a second control signal. Several center taps are arranged on the battery module train, by means of which a potential can be tapped at a connection between two battery modules respectively. Inputs of the multilevel inverter are connected to the taps.

12 Claims, 10 Drawing Sheets

DRIVE UNIT FOR AN ELECTRIC MOTOR

This application is a 35 U.S.C. §371 National Stage Application of PCT/EP2012/057474, filed on Apr. 24, 2012, which claims the benefit of priority to Serial No. DE 10 2011 075 429.6, filed on May 6, 2011 in Germany, the disclosures of which are incorporated herein by reference in their entirety.

The present disclosure relates to a drive unit for an electric motor and to a motor vehicle having the drive unit of the disclosure.

BACKGROUND

The trend is that in future battery systems will be used increasingly both in stationary applications and in vehicles such as hybrid vehicles and electric vehicles. In order to be able to meet the demands which are made for a respective application in terms of voltage and available power, a large number of battery cells are connected in series. Since the current provided by such a battery must flow through all the battery cells, and a battery cell can conduct only a limited current, battery cells are often additionally connected in parallel in order to increase the maximum current. This can be done either by providing a plurality of cell windings within a battery cell housing or by externally interconnecting battery cells. However, one problem in this case is that compensation currents between the battery cells which are connected in parallel may occur on account of cell capacitances and voltages which are not exactly identical.

FIG. 1 illustrates the basic circuit diagram of a conventional electric drive unit as is used, for example, in electric and hybrid vehicles or else in stationary applications such as for rotor blade adjustment in wind power plants. A battery 10 is connected to a DC voltage intermediate circuit which is buffered by a capacitor 11. A pulse-controlled inverter 12 is connected to the DC voltage intermediate circuit and provides sinusoidal voltages, which are out of phase with respect to one another, at three outputs via in each case two switchable semiconductor valves and two diodes for the operation of an electric drive motor 13. The capacitance of the capacitor 11 must be large enough to stabilize the voltage in the DC voltage intermediate circuit for a period of time in which one of the switchable semiconductor valves is connected. In a practical application, such as an electric vehicle, a high capacitance is obtained in the mF range. Owing to the usually very high voltage of the DC voltage intermediate circuit, such a high capacitance can be realized only at great expense and with a large requirement in terms of space.

FIG. 2 shows the battery 10 from FIG. 1 in a more detailed block diagram. A multiplicity of battery cells are connected in series and optionally additionally in parallel in order to achieve a high output voltage and battery capacity which are desired for a respective application. A charging and disconnection device 16 is connected between the positive pole of the battery cells and a positive battery terminal 14. Optionally, a disconnection device 17 can additionally be connected between the negative pole of the battery cells and a negative battery terminal 15. The disconnection and charging device 16 and the disconnection device 17 each comprise a contactor 18 and, respectively, 19 which are provided for disconnecting the battery cells from the battery terminals 14, 15 in order to de-energize the battery terminals. Otherwise, there is considerable potential danger to servicing personnel or the like on account of the high DC voltage from the series-connected battery cells. A charging contactor 20 with a charging resistor 21 connected in series with the charging contactor 20 is additionally provided in the charging and disconnection device 16. The charging resistor 21 limits a charging current for the capacitor 11 when the battery is connected to the DC voltage intermediate circuit. For this purpose, the contactor 18 is initially left open and only the charging contactor 20 is closed. Once the voltage at the positive battery terminal 14 reaches the voltage of the battery cells, the contactor 18 can be closed and the charging contactor 20 may be opened. The contactors 18, 19 and the charging contactor 20 increase the costs of a battery 10 to a considerable extent since stringent demands are made of them in respect of reliability and the currents to be carried by them.

The series connection of a high number of battery cells means that, in addition to the high overall voltage, there is the problem that the entire battery fails if a single battery cell fails because the battery current has to be able to flow in all the battery cells owing to the series connection. Such a failure of the battery can lead to a failure of the entire system. In the case of an electric vehicle, a failure of the drive battery causes the vehicle to become immobile, and in other devices, such as for example the rotor blade adjustment in the case of wind power plants this can even lead to undesired situations in the case of strong wind. For this reason, a high level of reliability of the battery is advantageous. According to the definition, the term "reliability" means the ability of a system to operate correctly for a predefined time.

SUMMARY

Therefore, a drive unit for an electric motor, in particular an electric drive motor, is provided according to the disclosure. The drive unit comprises a multilevel inverter and a battery having at least one battery module string, which comprises a plurality of series-connected battery modules. Each battery module comprises at least one battery cell and a coupling unit. The at least one battery cell is connected between a first input and a second input of the coupling unit. The coupling unit is designed to connect the at least one battery cell between a first terminal of the battery module and a second terminal of the battery module in response to a first control signal, and to connect the first terminal to the second terminal in response to a second control signal. A plurality of center taps, by means of which a potential at a connection between in each case two battery modules can be tapped, are arranged at the battery module string. For this purpose, the two battery modules are adjacent in the series circuit. Inputs of the multilevel inverter are connected to the center taps.

All or some of the coupling units which are arranged in the battery modules can have an output and can be designed to connect either the first input or the second input to the output in response to the first control signal. In this case, the output is connected to the first terminal or to the second terminal of the respective battery module.

A battery module or a multiplicity of battery modules can be arranged between two adjacent center taps. Since typically a multiplicity of center taps is provided on the battery module string, a different number of battery modules can also be arranged between pairs of in each case adjacent center taps. However, it is preferable for the center taps to divide the battery module string such that each division of the battery module string comprises the same number of battery modules. A plurality of battery modules between two adjacent center taps can be combined to form an overall module.

Preferably, the drive unit comprises a control unit and the control unit is designed to output the first control signal to a first variable number of battery modules of the at least one battery module string, to output the second control signal to the remaining battery modules of the at least one battery module string and to output a third control signal to the multilevel inverter. In this way, a potential at an output of the multilevel inverter can be variably adjusted.

In typical applications, the control signals output by the control unit are selected such that a sinusoidal potential is adjusted at an output of the multilevel inverter. In this case, the sinusoidal potential can be adjustable with an adjustably predefinable frequency.

A further aspect of the disclosure relates to a battery, preferably a lithium-ion battery, which comprises a multilevel inverter. Here, the battery forms a drive unit according to the first aspect of the disclosure; that is to say that the drive unit according to the disclosure is comprised by the battery. In particular, the battery according to the disclosure comprises at least one battery module string having battery modules in which the described coupling units are arranged.

A further aspect of the disclosure relates to a motor vehicle having an electric drive motor for driving the motor vehicle. A drive unit according to the disclosure is connected to the electric drive motor, said drive unit also being able to be formed by a battery, if said battery comprises a multilevel inverter, which is connected to the center taps of a battery module string.

BRIEF DISCRIPTION OF THE DRAWING

Exemplary embodiments are explained in more detail with reference to the drawings and the following description, wherein identical reference signs denote identical or functionally identical components. In the drawings.

Figure 1:
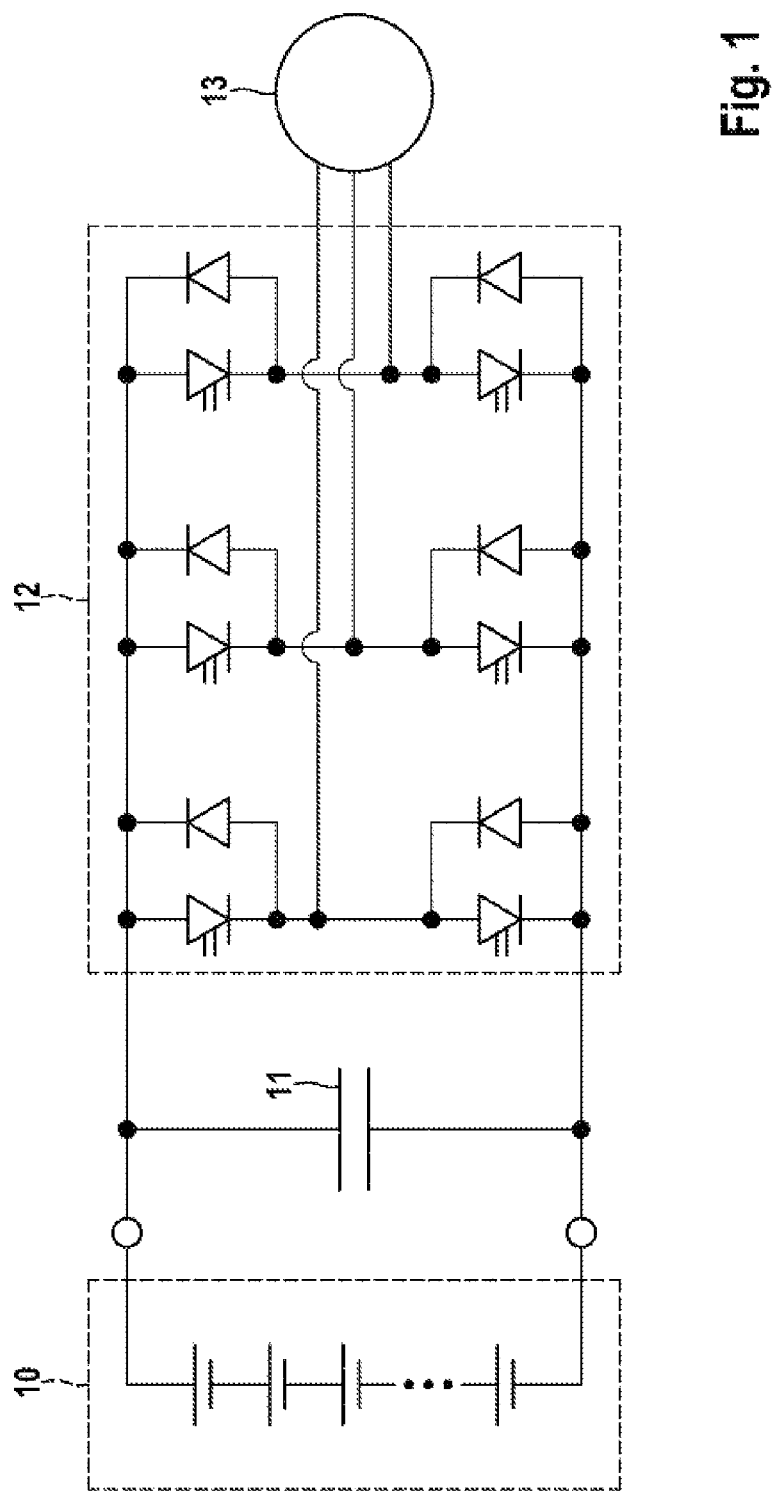
FIG. 1 shows an electric drive unit according to the prior art.
Figure 2:
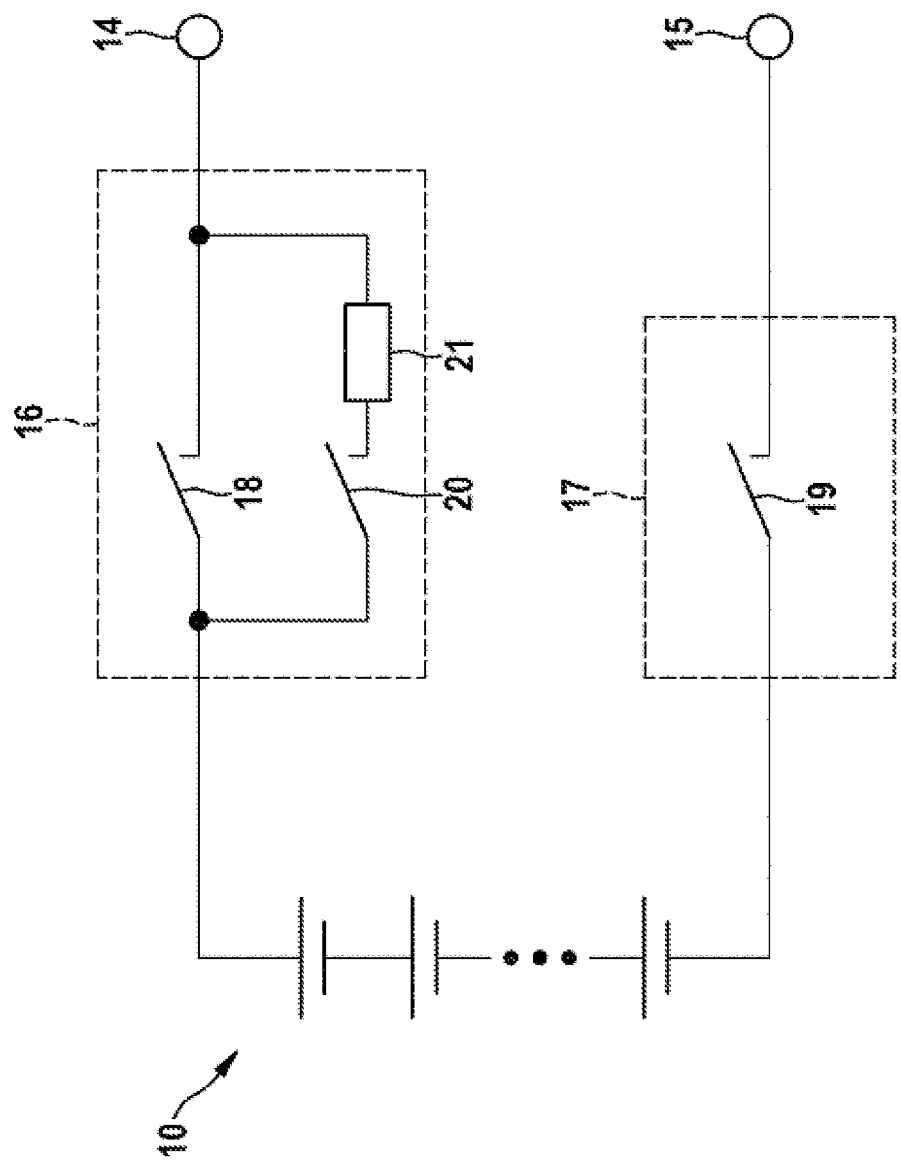
FIG. 2 shows a block diagram of a battery according to the prior art.
Figure 3:
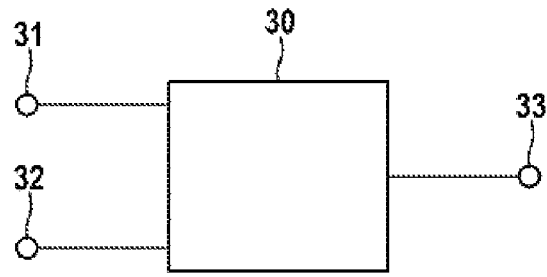
Figure 4:
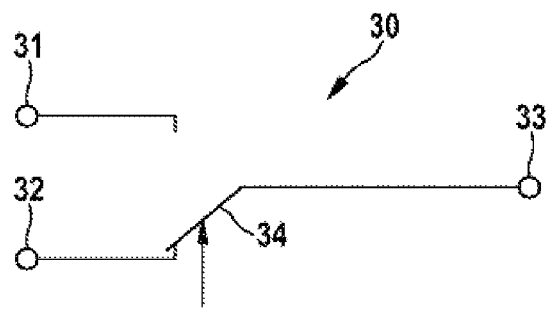
Figure 5:
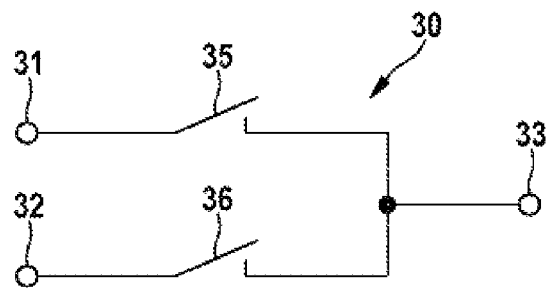
Figure 6:
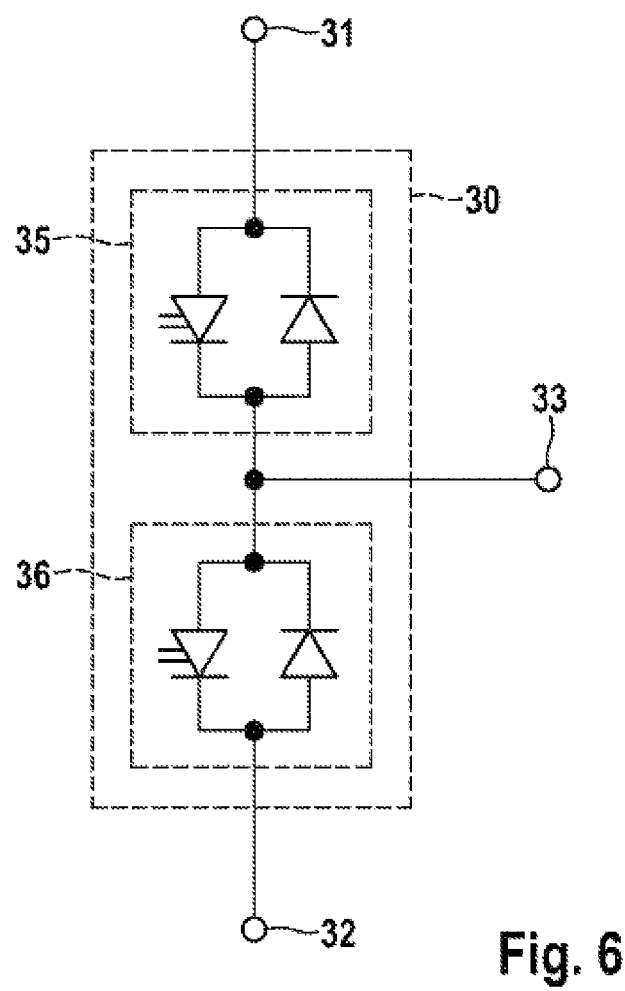
Figure 7:
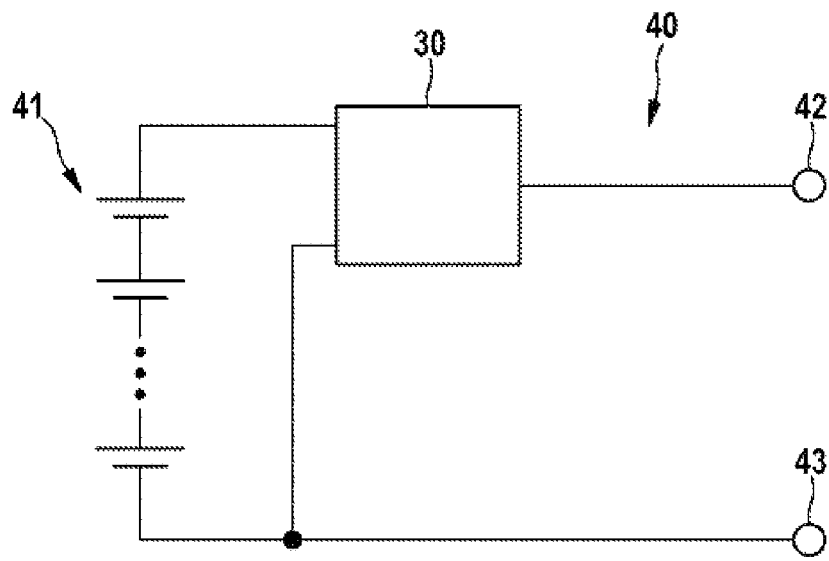
Figure 8:
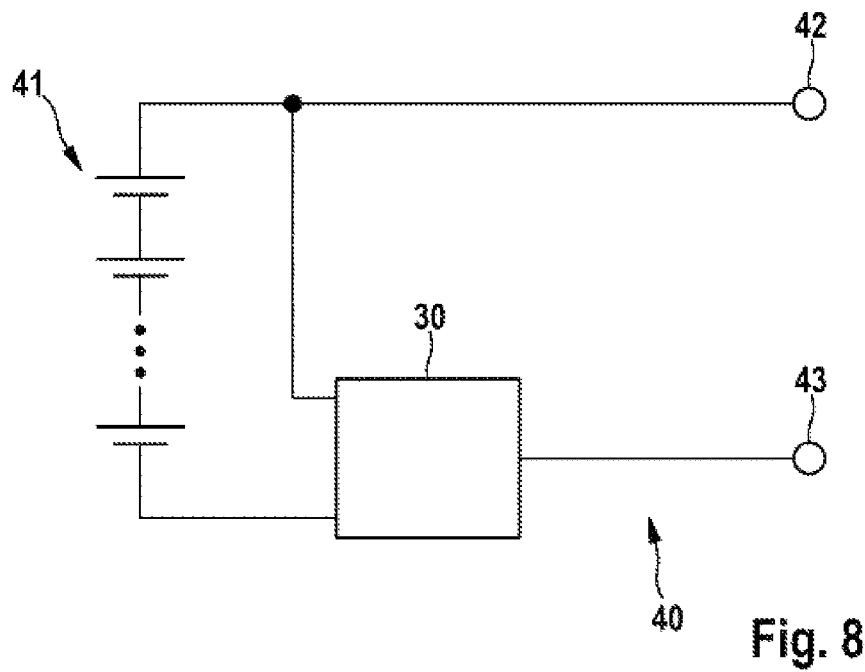
Figure 9:
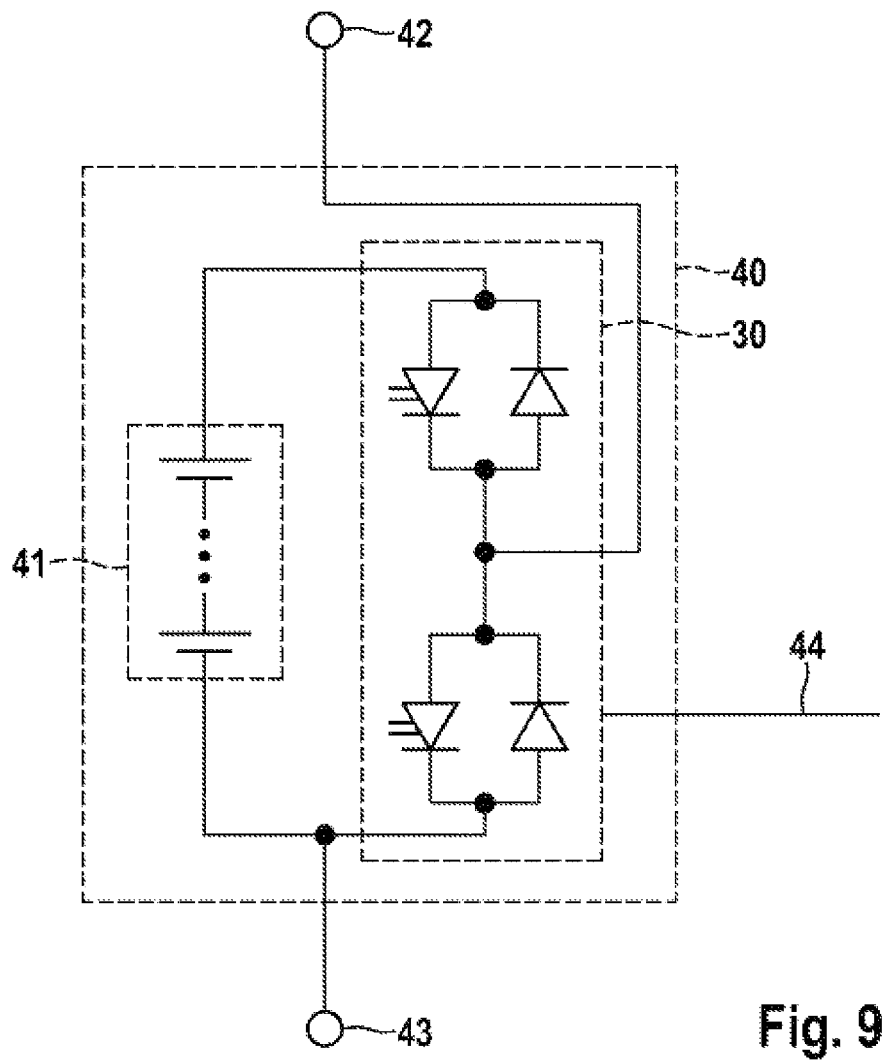
Figure 10:
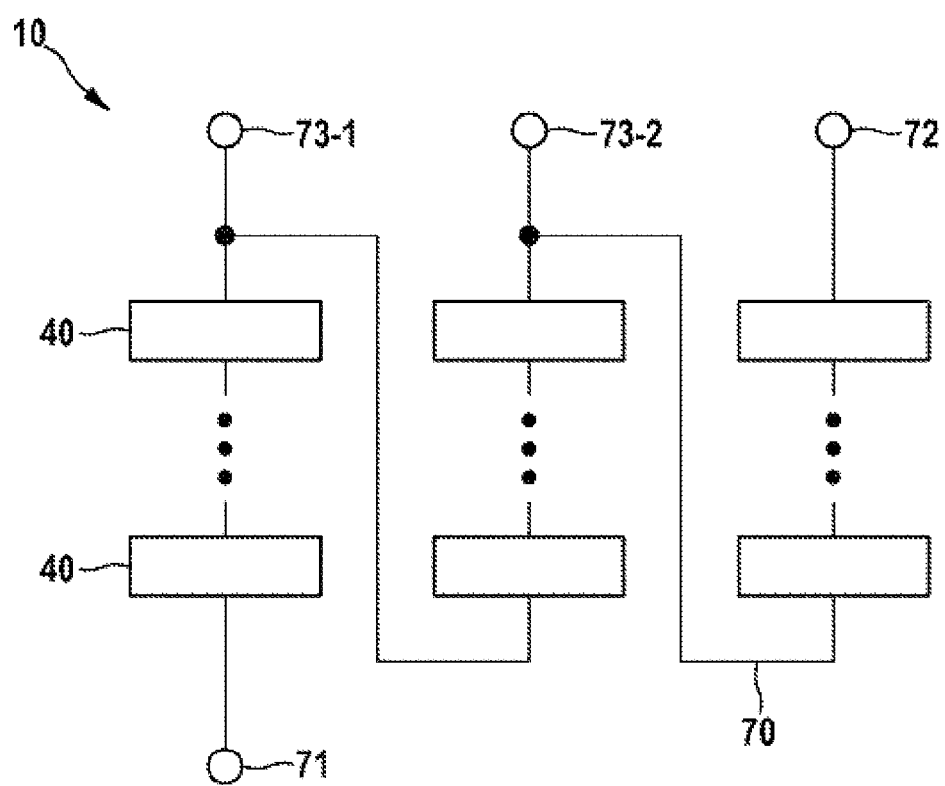
Figure 11:
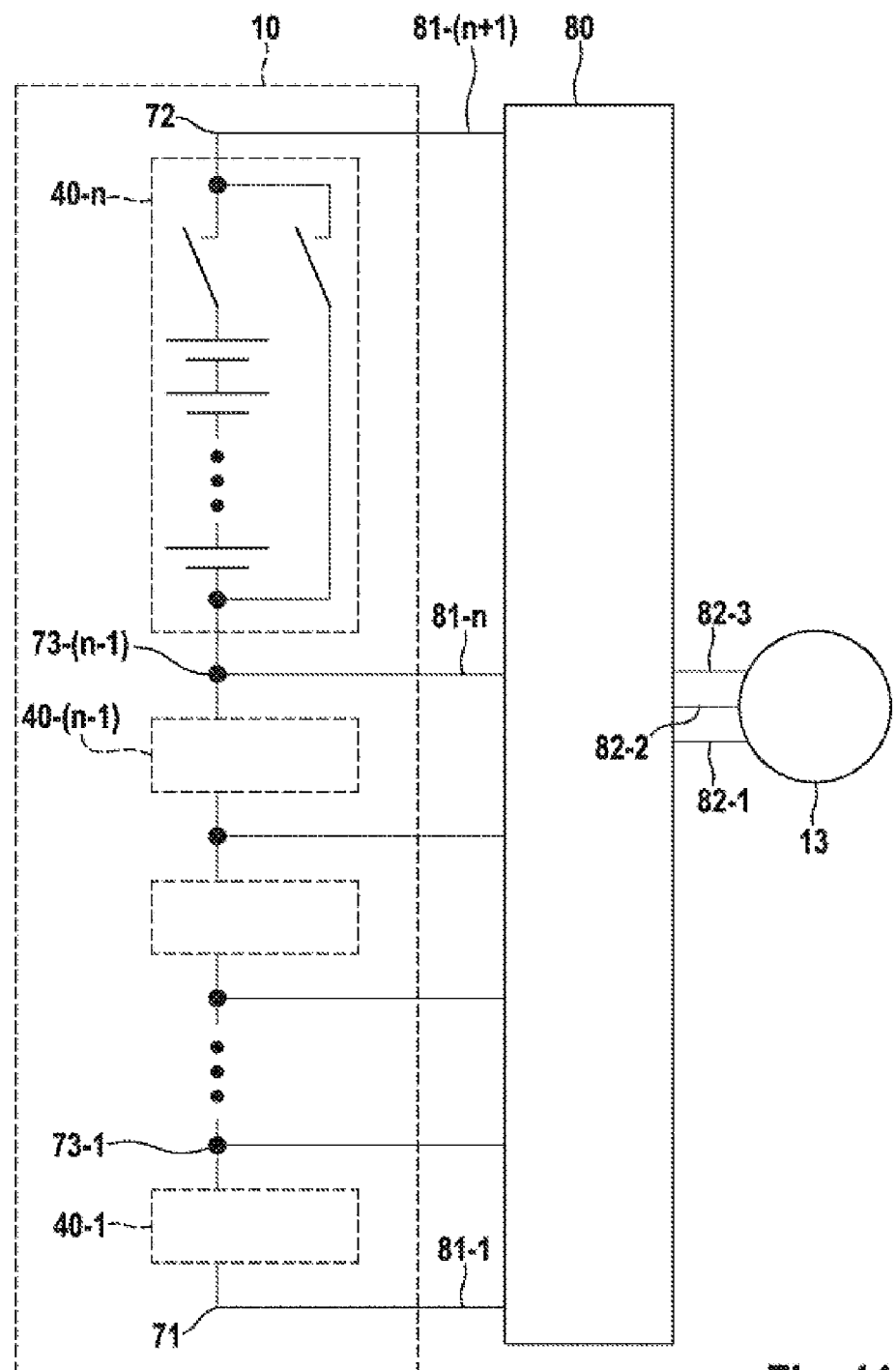
Figure 12:
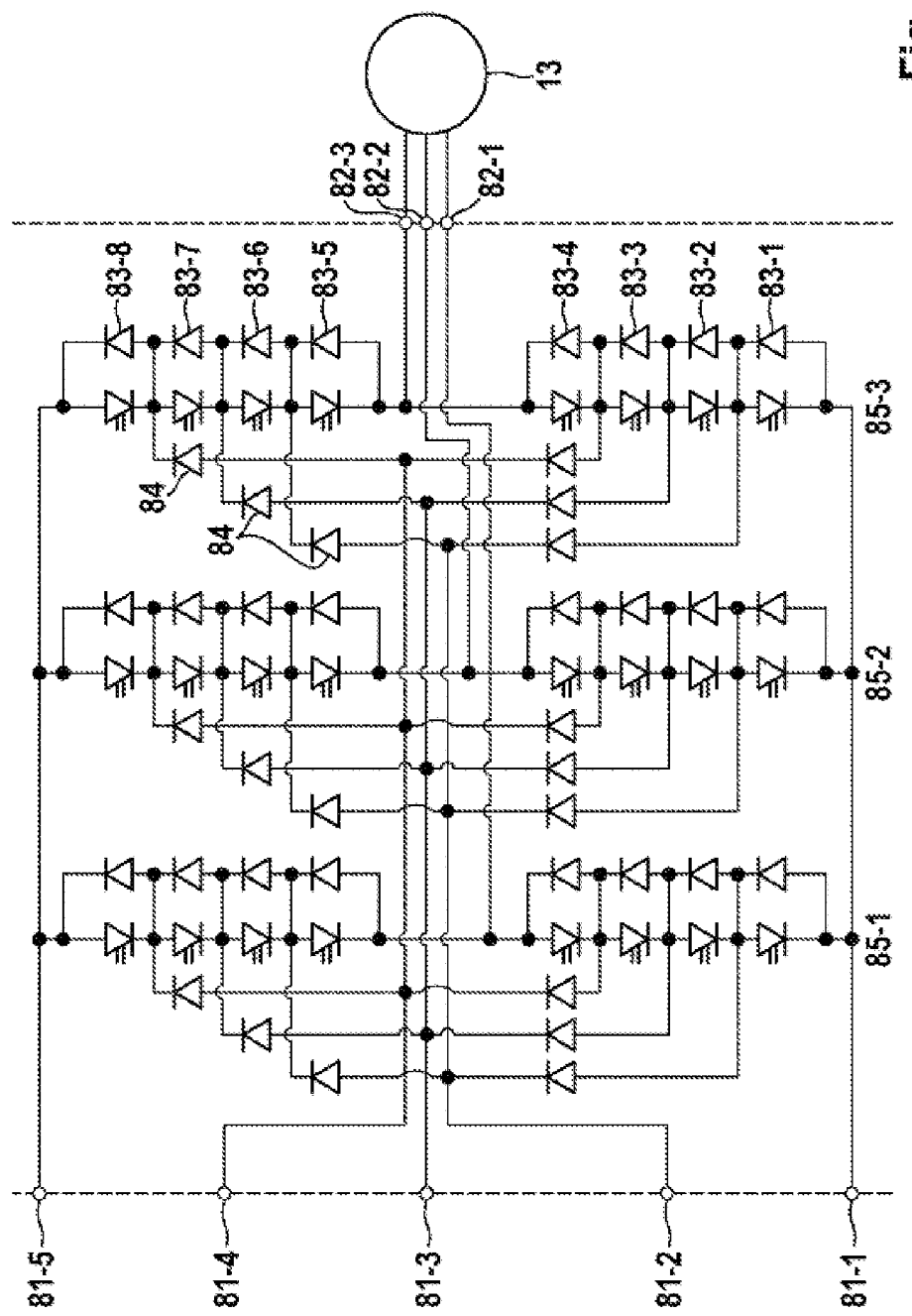
Figure 13:
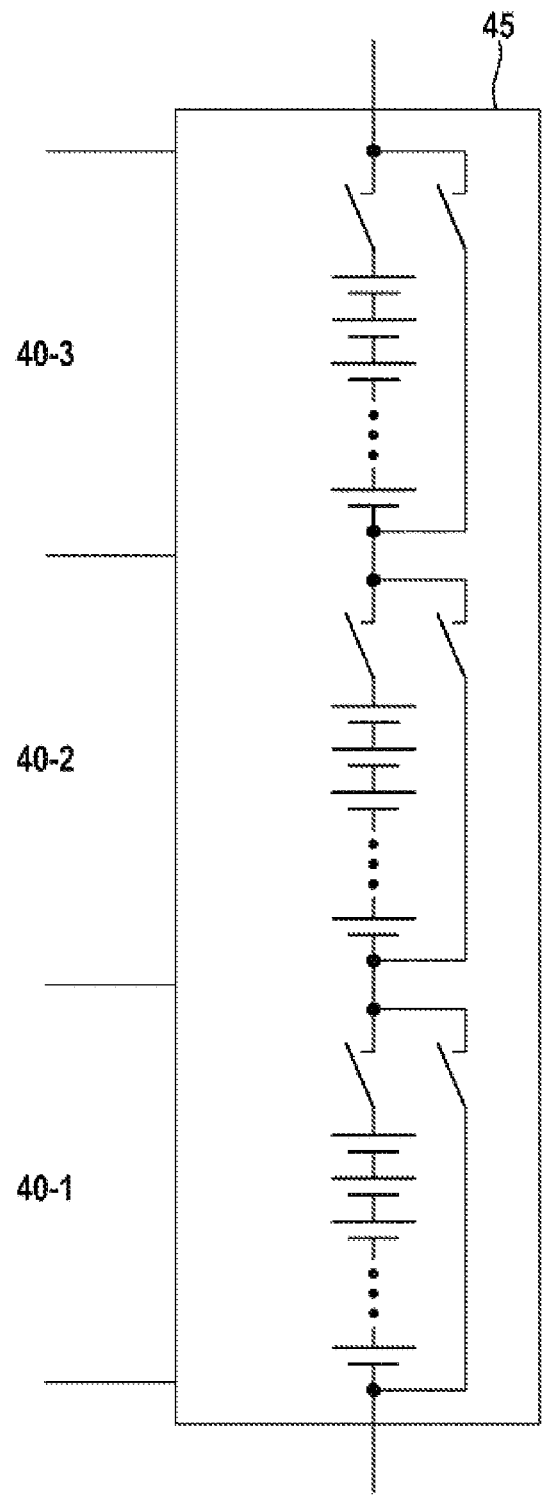

FIG. 3 shows a coupling unit which is usable in a battery module string in the drive unit according to the disclosure, FIG. 4 shows a first embodiment of the coupling unit, FIG. 5 shows a second embodiment of the coupling unit, FIG. 6 shows the second embodiment of the coupling unit in a simple semiconductor circuit, FIG. 7 shows one arrangement of the coupling unit in a battery module, FIG. 8 shows another arrangement of the coupling unit in a battery module, FIG. 9 shows the coupling unit illustrated in FIG. 6 in the arrangement illustrated in FIG. 7, FIG. 10 shows a battery which is usable in the drive unit according to the disclosure, FIG. 11 shows a drive unit for an electric drive motor according to an embodiment of the disclosure, FIG. 12 shows an example of a four-stage multilevel inverter which is usable in the drive unit according to the disclosure, and FIG. 13 shows an overall module having three battery modules which is usable in the drive unit according to the disclosure.

DETAILED DESCRIPTION

FIG. 3 shows a coupling unit 30 which is usable in a battery module string in the battery according to the disclosure. The coupling unit 30 has two inputs 31 and 32 and an output 33 and is designed to connect one of the inputs 31 or 32 to the output 33 and to decouple the other. In certain embodiments of the coupling unit, said coupling unit can also be designed to disconnect both inputs 31, 32 from the output 33. However, no provision is made for both the input 31 and the input 32 to be connected to the output 33.

FIG. 4 shows a first embodiment of the coupling unit 30 which has a changeover switch 34 which in principle can connect only one of the two inputs 31, 32 to the output 33 while the respective other input 31, 32 is decoupled from the output 33. The changeover switch 34 can be implemented in a particularly easy manner as an electromechanical switch.

FIG. 5 shows a second embodiment of the coupling unit 30, in which a first and a second switch 35 and 36, respectively, are provided. Each of the switches is connected between one of the inputs 31 and 32, respectively, and the output 33. In contrast to the embodiment shown in FIG. 4, this embodiment has the advantage that both inputs 31, 32 can also be decoupled from the output 33, with the result that the output 33 becomes highly resistive. In addition, the switches 35, 36 can be implemented simply as semiconductor switches, such as metal-oxide semiconductor field-effect transistor (MOSFET) switches or insulated-gate bipolar transistor (IGBT) switches, for example. Semiconductor switches have the advantage of being inexpensive and having a high switching speed, with the result that the coupling unit 30 can respond to a control signal or a change in the control signal within a short period of time and high changeover rates are achievable.

FIG. 6 shows the second embodiment of the coupling unit in a simple semiconductor circuit, in which each of the switches 35, 36 comprises in each case a semiconductor valve which can be switched on and off and a diode which is connected in parallel therewith.

FIGS. 7 and 8 show two arrangements of the coupling unit 30 in a battery module 40. A plurality of battery cells 41 (preferably lithium-ion battery cells) are connected in series between the inputs of a coupling unit 30. However, the disclosure is not restricted to such a series circuit comprising battery cells; it is also possible for only an individual battery cell to be provided, or else a parallel circuit or mixed series and parallel circuit comprising battery cells. In the example in FIG. 7, the output of the coupling unit 30is connected to a first terminal 42 and the negative pole of the battery cells 41 is connected to a second terminal 43. However, a mirror-image arrangement as in FIG. 8 is possible, in which the positive pole of the battery cells 41 is connected to the first terminal 42 and the output of the coupling unit 30 is connected to the second terminal 43.

FIG. 9 shows the coupling unit 30 illustrated in FIG. 6 in the arrangement illustrated in FIG. 7. The coupling units 30 are actuated and diagnosed via a signal line 44 which is connected to a control device (not shown).

FIG. 10 shows a battery 10 which is usable in the drive unit according to the disclosure and which comprises a battery module string 70. The battery module string 70 consists of a plurality of series-connected battery modules 40 comprising a coupling unit 30 in each case and constructed as illustrated in FIG. 7 or 8. In the event that battery modules 40 are combined to form the battery module string 70, in each case the first terminal 42 of a battery module 40 is connected to the second terminal 43 of an adjacent battery module 40.

The battery module string 70 illustrated in FIG. 10 comprises six battery modules 40 which are connected between a negative pole 71 and a positive pole 72 of the battery module string 70. Two center taps 73-1, 73-2, by means of which a potential at a connection between in each case two battery modules 40 which are adjacent to one another in the series circuit can be tapped, are arranged on the battery module string 70; that is to say that each of the two center taps 73-1, 73-2 is connected in each case to a first terminal 42 of a battery module 40 and to the second terminal 43 of an adjacent battery module 40.

Together, the negative pole 71, the positive pole 72 and the center taps 73-1, 73-2 of the battery module string 70 constitute the taps of the battery 10. Owing to the fact that the battery modules 40 arranged between the taps each comprise coupling units 30, the output voltages which can be adjusted at the taps are adjustable in steps.

A control unit (not illustrated) is designed to output a first control signal to a variable number of battery modules 40, by means of which control signal the coupling units 30 of the battery modules 40 actuated in this way connect the battery cell (or the battery cells) 41 between the first terminal 42 and the second terminal 43 of the respective battery module 40. At the same time, the control unit outputs a second control signal to the rest of the battery modules 40, by means of which the coupling units 30 of said remaining battery modules 40 connect the first terminal 42 and the second terminal 43 of the respective battery module 40, as a result of which the battery cells 41 of said battery module 40 are bypassed.

By suitably actuating the plurality of battery modules 40, different voltages can thus be output at the taps 71, 72, 73-1, 73-2 of the battery 10.

If, for example, the first control signal is output to the two battery modules arranged between the two center taps 73-1, 73-2 shown in FIG. 10, the voltage between the two center taps 73-1, 73-2 then assumes the maximum adjustable value. If, by contrast, the second control signal is output to the two battery modules 40, then a voltage of 0 volt is applied between the two center taps 73-1, 73-2. If the first control signal is output to one of the two battery modules 40 and the second control signal is output to the other battery module, then an individual module voltage is present between the center taps 73-1, 73-2.

If more than two battery modules 40 are arranged between two adjacent taps 71, 72, 73-1, 73-2 of the battery module string 70, then a voltage which corresponds to the sum of the module voltages of those battery modules 40 to which the control device outputs the first control signal is present between said adjacent taps.

By suitably selecting the switching states of the coupling units 30, the voltage between two taps 71, 72, 73-1, 73-2 of the battery 10 can thus be adjusted in steps between 0 volt and the maximum value. The quantization steps in the adjustment of the output voltage correspond to the module voltages of the battery modules 40 and are therefore dependent on the number of battery cells 41 in the battery modules 40 and on the state of charge of the battery cells 41.

The total output voltage between the negative pole 71 and the positive pole 72 of the battery module string results from the summation of all of the partial voltages between adjacent taps 71, 72, 73-1, 73-2 of the battery module string 70.

The center taps 73-1, 73-2 of the battery module string 70 illustrated in FIG. 10 divide said battery module string in such a way that each division of the battery module string 70 comprises two battery modules 40.

FIG. 11 shows a drive unit for an electric drive motor 13 having a battery 10 and a multilevel inverter 80. The multilevel inverter 80 has (n+1) inputs 81-1, ..., 81-(n+1) and three outputs 82-1, 82-2, 82-3 and is designed to output at each of its outputs 82-1, 82-2, 82-3 one of the potentials which is in each case present at one of its inputs 81-1, ..., 81-(n+1). The outputs 82-1, 82-2, 82-3 of the multilevel inverter 80 are connected to inputs of the electric drive motor 13.

Since most available electric motors are configured for a drive with three phase signals, the multilevel inverter 80 preferably has precisely three outputs 82-1, 82-2, 82-3. The inputs 81-1, ..., 81-(n+1) of the multilevel inverter 80 are connected both to (n−1) center taps 73-1, ..., 73-(n−1) and to the poles 71, 72 of the battery 10 which comprises n battery modules 40-1, ..., 40-n with coupling units. By virtue of the fact that the potential at each of the outputs 82-1, 82-2, 82-3 of the multilevel inverter 80 is variable and dependent on the potential values at the inputs 81-1, ..., 81-(n+1) thereof, and the potential values present at said inputs 81-1, ..., 81-(n+1) are in turn adjustable by suitable actuation of the n battery modules 40-1, ..., 40-n, there are multiple possible combinations of the actuation of the battery 10 and of the multilevel inverter 80 which generate an identical phase signal at the outputs 82-1, 82-2, 82-3 of the multilevel inverter 80, for example an approximately sinusoidal AC voltage.

The phase signals at the outputs 82-1, 82-2, 82-3 of the multilevel inverter 80 can thus be adjusted in steps. By adjusting a step-shaped profile of the potential at the outputs 82-1, 82-2, 82-3 of the multilevel inverter 80, the losses in the electric drive motor 13 can be reduced since the usual alternation between positive and negative intermediate circuit potential is absent in the arrangement according to the disclosure. In this way, the electromagnetic compatibility of the drive of the electric drive motor 13 is improved since the changes in potential at the inputs of said electric motor are lower. Likewise, the level of efficiency of the power electronics in the arrangement according to the disclosure is improved by virtue of the fact that switches with metal-oxide semiconductor field-effect transistors (MOSFETs) instead of insulated-gate bipolar transistors (IGBTs) can be used in the multilevel inverter 80.

By virtue of the fact that there are multiple possible combinations for the actuation of the battery 10 and of the multilevel inverter 80 in order to generate a predefined phase signal at the outputs 82-1, 82-2, 82-3 of the multilevel inverter 80 and thus also at the inputs of the electric motor 13, the actuation can be optimized to the effect that the battery modules 40 can be discharged evenly and thus for example no undesired reduction in the range of an electric vehicle, which is caused by imbalanced utilization of the battery cells 41, occurs. This has the advantage that the advantages of a multilevel inverter known from the prior art, in particular the high level of efficiency thereof, can be used in electric drives without the individual battery modules 40 having to be discharged differently in a load-dependent manner.

FIG. 12 shows an example of a four-stage multilevel inverter which is usable in the drive unit according to the disclosure and comprises five inputs 81-1, ..., 81-5 and three outputs 82-1, 82-2, 82-3, wherein the latter are connected to inputs of the electric drive motor 13. The phase signals at the three outputs 82-1, 82-2, 82-3 are in each case controllable by means of switching elements which are arranged for each of the three outputs 82-1, 82-2, 82-3 in one of three strings 85-1, 85-2, 85-3. The mode of operation of the multilevel inverter 80 illustrated in FIG. 12 is described by way of example below on the basis of the string 85-3, which provides the phase signal at the output 82-3.

The string 85-3 comprises eight switching elements 83-1, ..., 83-8 which in each case consist of a semiconductor valve which can be switched on and off and a diode connected in parallel therewith, similar to the embodiment of the coupling unit 30 illustrated in FIG. 6. The switching elements 83-1, ..., 83-8 are divided into complementary pairs (83-1, 83-5), (83-2, 83-6), (83-3, 83-7), (83-4, 83-8). The actuation of each of the complementary pairs (83-1, 83-5), (83-2, 83-6), (83-3, 83-7), (83-4, 83-8) is effected such that, when one of the switching elements is closed, the switching element which is complementary thereto is open. If the open state is represented by 0 and the closed state represented by 1, then a potential is output as follows at the output 82-3 of the multi-level inverter by means of a combination of the states of the switching elements 83-1, . . . , 83-8, which potential equals the potential at one of the inputs 81-1, . . . , 81-5 of the multilevel inverter 80:

potential at the output 82-3=potential at the input 81-1: 11110000;

potential at the output 82-3=potential at the input 81-2: 01111000;

potential at the output 82-3=potential at the input 81-3: 00111100;

potential at the output 82-3=potential at the input 81-4: 00011110;

potential at the output 82-3=potential at the input 81-5: 00001111.

If, for example, the switch combination 00011110 is selected, with the result that the potential at the output 82-3 equals the potential at the input 81-4, then, for the case in which the inputs 81-1, . . . , 81-5 are connected to taps of the battery 10 between which only one battery module 40 is arranged in each case, depending on the actuation of the battery modules 40, a voltage can be generated which corresponds to between 0 V and the sum of three module voltages, wherein said voltage is adjustable in steps.

The semiconductor valves which can be switched on and off and the intrinsic diodes thereof (illustrated separately) of the eight switching elements 83-1, . . . , 83-8 must be configured in terms of the blocking voltage thereof for only 1/n of the total battery voltage (n corresponding to the number of steps of the multilevel inverter 80, i.e. 4 in this case). As a result, switches with metal-oxide semiconductor field-effect transistors (MOSFETs) instead of insulated-gate bipolar transistors (IGBTs) can be used in the multilevel inverter 80.

The multilevel inverter illustrated in FIG. 12 operates with voltage limitation via a network of diodes 84. These serve to supply the taps 71, 73-1, . . . , 73-(n−1), 72, of the battery 10 to the switching elements 83-1, . . . , 83-8 while at the same time preventing battery modules 40 from being short-circuited, which can occur with direct connection without diodes 84. The diodes 84 must be differently dimensioned in terms of their blocking ability. The largest blocking voltage in the region of the switching elements 83-5, . . . , 83-8 must, for example, be taken up by the diode 84 which is connected between the input 81-2 and the switching element 83-5. The situation is correspondingly in mirror-inverted form in the case of the diodes 84 in the region of the switching elements 83-1, . . . , 83-4.

A battery module (as in FIG. 11) or a plurality of battery modules 40 having a coupling unit 30 in each case can be arranged between adjacent taps 71, 72, 73 of the battery 10. It is also possible to combine a plurality of said adjacent battery modules 40, conceptually or in terms of the construction thereof, to form an overall module 45 in which the battery modules 40 then assume the function of submodules. FIG. 13 shows an overall module 45 of this type which consists of three battery modules (submodules) 40-1, 40-2, 40-3 connected in series. The output voltage of the overall module 45 can be increased starting from 0 V (when all of the battery cells are bypassed) in three steps up to the maximum overall-module voltage (when all of the battery cells are connected).

When using the illustrated overall module 45 in the drive unit according to the disclosure, the input voltages of the multilevel inverter are thus adjustable in steps. In this way, an additional degree of freedom occurs in relation to the loading of the cells of the battery modules, which for example can be used for an even discharging of the battery or an even aging of the battery cells. Moreover, the number of steps of the multilevel inverter and, as a result, the number of semiconductor elements thereof can be reduced. By means of a smart actuation of the overall arrangement, approximately the same performance can be produced at the outputs of the multilevel inverter.

The illustrated arrangement makes it possible to construct a drive unit which has a significantly higher level of efficiency compared to a classic drive with an inverter having insulated-gate bipolar transistors (IGBTs), in particular in the range of a partial modulation with low currents. Said operating ranges are important for example in electric vehicles since the drives operate in this region most of the time. Thus the range of electric vehicles having the arrangement illustrated here can be increased.

The invention claimed is:

1. A drive unit for an electric motor comprising:
   a multilevel inverter; and
   a battery having at least one battery module string including a plurality of series-connected battery modules,
   wherein each battery module includes at least one battery cell and a coupling unit,
   wherein the at least one battery cell is connected between a first input and a second input of the coupling unit and the coupling unit is configured to connect the at least one battery cell between a first terminal of the battery module and a second terminal of the battery module in response to a first control signal, and to connect the first terminal to the second terminal in response to a second control signal,
   wherein a plurality of center taps are arranged at the battery module string and are configured to tap a potential at a connection between in each case two battery modules in the plurality of battery modules, and
   wherein inverter inputs of the multilevel inverter are connected to the center taps.

2. The drive unit as claimed in claim 1, wherein:
   the coupling unit has a coupling output and is configured to connect one of the first input and the second input to the coupling output in response to the first control signal, and
   the coupling output is connected to one of the first terminal and the second terminal of the battery module.

3. The drive unit as claimed in claim 1, wherein a battery module in the plurality of battery modules is arranged between two adjacent center taps in the plurality of center taps.

4. The drive unit as claimed in claim 1, wherein two or more battery modules in the plurality of battery modules are arranged between two adjacent center taps in the plurality of center taps.

5. The drive unit as claimed in claim 4, wherein the two or more battery modules between the two adjacent center taps are combined to form an overall module.

6. The drive unit as claimed in claim 1, wherein the plurality of center taps divide the battery module string such that each division of the battery module string includes an equal number of battery modules.

7. The drive unit as claimed in claim 1, further comprising:
   a control unit configured to output the first control signal to a first variable number of battery modules of the at least one battery module string, to output the second control signal to the remaining battery modules of the at least one battery module string and to output a third control signal to the multilevel inverter to variably adjust a potential at an inverter output of the multilevel inverter.

8. The drive unit as claimed in claim 7, wherein the control unit is configured to adjust a sinusoidal potential at the inverter output of the multilevel inverter.

9. The drive unit as claimed in claim 8, wherein the control unit is configured to adjust the sinusoidal potential at an adjustably predefinable frequency.

10. A battery comprising:

a multilevel inverter; and at least one battery module string including a plurality of series-connected battery modules, each of which includes at least one battery cell and a coupling unit, wherein the at least one battery cell is connected between a first input and a second input of the coupling unit and the coupling unit is configured to connect the at least one battery cell between a first terminal of the battery module and a second terminal of the battery module in response to a first control signal, and to connect the first terminal to the second terminal in response to a second control signal, wherein a plurality of center taps are arranged at the battery module string and are configured to tap a potential at a connection between in each case two battery modules in the plurality of battery modules, wherein inverter inputs of the multilevel inverter are connected to the center taps, and wherein the battery forms a drive unit.

11. A motor vehicle comprising:

an electric drive motor configured to drive the motor vehicle; and a battery as claimed in claim 10 connected to the electric drive motor.

12. A motor vehicle comprising:

an electric drive motor configured to drive the motor vehicle; and a drive unit connected to the electric drive motor, wherein the drive unit includes a multilevel inverter and a battery having at least one battery module string including a plurality of series-connected battery modules, wherein each battery module includes at least one battery cell and a coupling unit, wherein the at least one battery cell is connected between a first input and a second input of the coupling unit and the coupling unit is configured to connect the at least one battery cell between a first terminal of the battery module and a second terminal of the battery module in response to a first control signal, and to connect the first terminal to the second terminal in response to a second control signal, wherein a plurality of center taps are arranged at the battery module string and are configured to tap a potential at a connection between in each case two battery modules in the plurality of battery modules, and wherein inverter inputs of the multilevel inverter are connected to the center taps.

* * * * *